Patented Mar. 2, 1926.

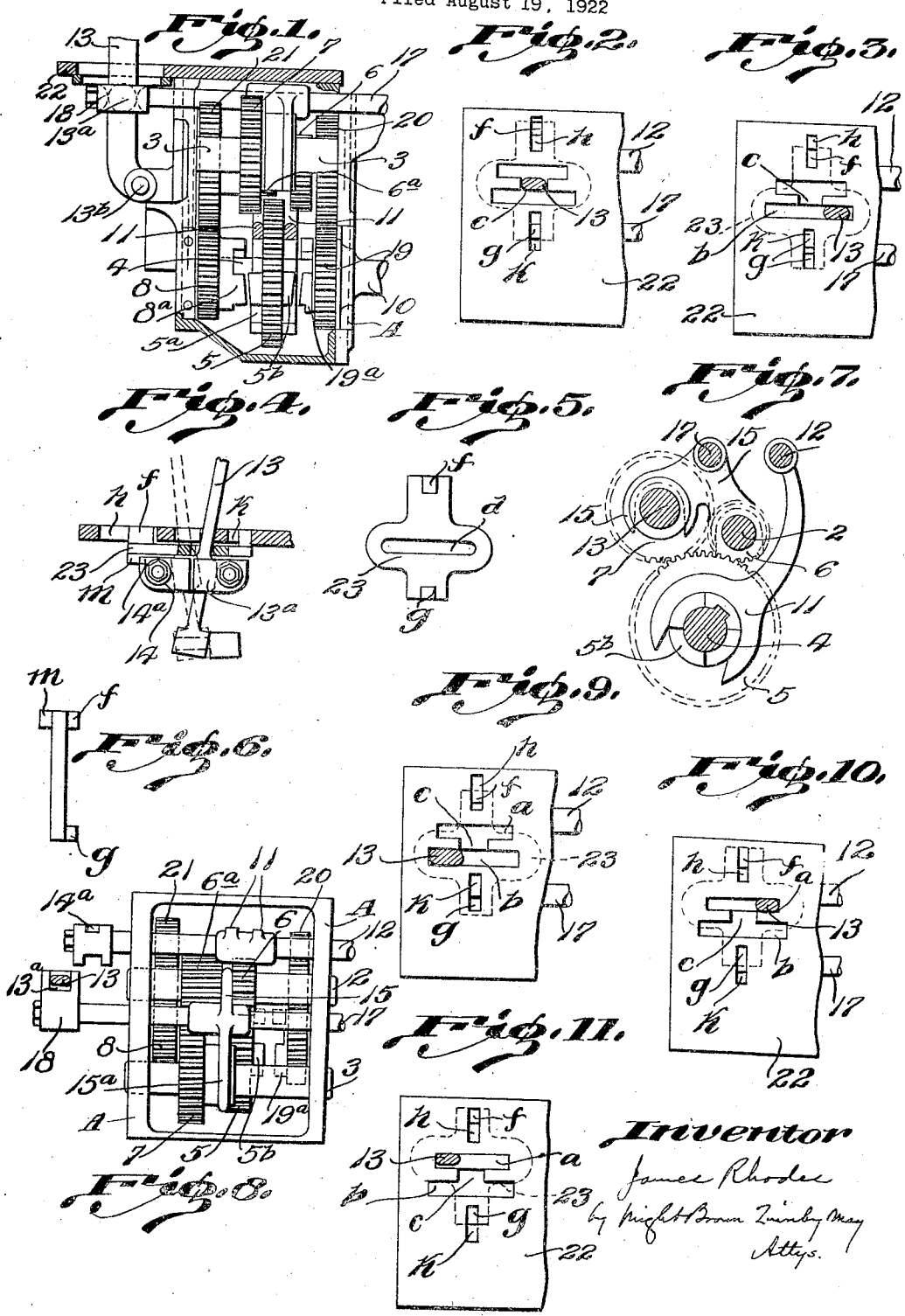
March 2, 1926.
J. RHODES
1,574,936
CHANGE SPEED GEARING FOR MOTOR ROAD VEHICLES
Filed August 19, 1922

1,574,936

UNITED STATES PATENT OFFICE.

JAMES RHODES, OF BRADFORD, ENGLAND.

CHANGE-SPEED GEARING FOR MOTOR ROAD VEHICLES.

Application filed August 19, 1922. Serial No. 583,016.

*To all whom it may concern:*

Be it known that I, JAMES RHODES, a subject of the King of Great Britain, and resident of 153 Manningham Lane, Bradford, in the county of York, England, have invented a certain new and useful Improvement in Change-Speed Gearing for Motor Road Vehicles, of which the following description, having reference to the accompanying sheets of drawings, is a specification.

It relates to change speed gearing for motor road vehicles or for transmitting rotary motion to other kinds of mechanism and consists in so arranging the toothed gearing wheels and the parts by which they are operated by the hand lever devices, that I am enabled to mount change speed gearing for effecting three different speeds in one direction and a single speed in the reverse direction, in the same space that has heretofore been occupied by gearing only permitting two speeds and a reverse, to be effected, while my said gearing is considerably stronger. My said invention has more especial reference to the mounting of my three speed and reverse gearing within casings at present in existance which usually enclose gearing for securing two speeds forward and one reverse.

In order that my said invention may be readily understood, I have hereunto appended sheets of drawings illustrative thereof, to which by figures and letters, reference is made in the following description.

Fig. 1 is an elevation of an embodiment of the invention, the gearing casing being shown in section.

Fig. 2 is a plan, showing particularly the "gate" in the cover of the gear casing through which the operating lever passes.

Fig. 3 is a view similar to Fig. 2, showing the operating lever in a different position.

Fig. 4 is a vertical section.

Fig. 5 is a detail view of the "locking plate" hereinafter referred to.

Fig. 6 is an edge view of the "locking plate".

Fig. 7 is an end elevation of the gearing, the casing being removed.

Fig. 8 is a plan of the gearing, the top of the casing being removed.

Fig. 9 is a view similar to Figs 2 and 3, illustrating a third position of the operating lever.

Fig. 10 is a view like Fig. 9 showing the operating lever in a fourth position.

Fig. 11 is a view like Fig. 9 in which the operating lever is in still another position.

A indicates the box or casing within which the gears are mounted.

In carrying my invention into effect I make use of three shafts, two counter-shafts 2 and 3 and a driven shaft 4 (this latter shaft may be appropriately styled a transmission shaft) and upon these three shafts I mount the wheels 6 ($6^a$) 7 and 5 respectively. The wheels 5 and 6 ($6^a$) are splined to or are mounted to slide upon keyways upon the shafts 4 and 2 respectively (although I may not spline the wheels 6 ($6^a$) to the shaft 2 but may use "dog-clutches" as hereinafter explained) while the wheel 7 runs loosely upon and is arranged to slide longitudinally over the shaft 3 which shaft may be fixed.

The shaft 4 extends through the casing A and is in perfect alignment with the main or engine shaft 10 so that the end of the said shaft 4 may enter and run loosely within the hub of the wheel 19 where antifriction bearings may be mounted if desired.

This wheel 19 is fixed upon the main shaft 10 and is arranged to gear with the wheel 20 which is fixed upon the shaft 2. Upon the other end of the shaft 2 is fixed a wheel 21 which is arranged to gear with the wheel 8 mounted to run loosely upon the shaft 4. By this arrangement of the said wheels 19, 20, 21 and 8 they are permanently in gear with each other as stated, and whenever the engine or main shaft 10 revolves so also do all of these wheels revolve.

The wheels 6 and $6^a$ are formed integrally with each other (the wheel 6 being larger in diameter than the wheel $6^a$) and have a circumferential groove between them to receive one part of the operating fork 15 which enters same to act thereon as hereinafter explained.

The wheel 20 has its periphery and teeth formed to extend laterally from a disc produced integrally therewith and with the hub thereof so that a hollow is provided in said wheel into which the wheel 6 may be slid. By this construction and arrangement the several parts may be made to occupy comparatively little space in a lateral direction.

In the claims:

The wheel $6^a$ is in permanent mesh with the wheel 7 and this wheel 7 has a circumferential groove formed in its hub to receive the other part 15ª of the operating fork 15 so that by this duplex fork 15 (15ª) being reciprocated horizontally so will the wheels 6 (6ª) and 7 be moved upon or longitudinally over the shafts 2 and 3.

As before stated the wheel 5 is splined to the shaft 4 and by its longitudinal motions over said shaft, it is at one time made to mesh or gear with the wheel 6 and at another time with the wheel 7 in the manner and with the results hereinafter explained. The wheel 5 has clutches 5ª and 5ᵇ formed laterally upon its hub so that by the former engaging with a corresponding clutch 8ª formed upon the wheel 8, it may receive rotary motion from said wheel 8, while by the latter clutch 5ᵇ engaging with a similar or corresponding clutch 19ª formed on the wheel 19 the rotary motions of this said wheel 19 may be directly transmitted to the said wheel 5.

The wheel 5 is moved longitudinally over the shaft 4 by means of the duplex or bifurcated operating fork 11, the two legs of which span or take over the wheel 5 as is shown by Figs. 1 and 7.

The fork 11 is fixed upon the bar 12 which is mounted upon the walls of the casing A so that it may slide longitudinally thereon, and the fork 15 is fixed upon the bar 17 similarly mounted to slide longitudinally upon its bearings.

Upon the outer ends of these bars 12 and 17 are fixed the slotted or grooved blocks 14 and 18 respectively, so that an enlarged part 13ª of the handle-lever 13 may take into the slots or grooves in said blocks 14 and 18. The slot in the block 18 is sufficiently deep to permit the enlarged part 13ª wholly to enter therein as is shown by Fig. 8 at which time said part 13ª is entirely clear of the slot in the block 14. The slot in the block 14 is shallower than that in the block 18 so that when the part 13ª enters to the full extent therein, there yet remains a portion of said part 13ª within the slot of the block 18, hence whenever the handle 13 is oscillated about its pivot 13ᵇ motion is at all times transmitted to the block 18 and therefore to the fork 15 (15ª) and the wheels 6, (6ª) and 7. Whereas unless the part 13ª is in engagement with the block 14 this latter and therefore the bar 12, fork 11 and wheel 5 are allowed to be stationary, however by the part 13ª partly leaving the slot in the block 18 and entering the slot in the block 14, then the two forks 15 (15ª) and 11 may be operated simultaneously.

The extending end or handle part of the lever 13 passes through a slot in an extension from the cover 22 of the box A. This slot is of the compound form shown by Figs. 2, 3, 9, 10 and 11, having two main slots $a$ and $b$ and a gateway $c$ between them so that the handle 13 may move lengthwise the slot $a$ when situated in said slot, or it may move laterally therefrom through the gateway $c$ (where it may remain as is hereinafter explained) into the slot $b$ along which it may also move lengthwise.

Mounted to slide beneath the cover 22 is a slotted plate 23 in such relative position with the slots $a$, $b$ and $c$ therein that the handle 13 in passing through said slots has to pass through a slot $d$ (see Fig. 5) formed in the plate 23. This plate 23 has fixed upon its lateral arms projections $f$ and $g$ which are arranged to take into guiding slots $h$ and $k$ made in the cover 22 so that it may be thereby guided in its lateral movements while it is held against motion in the direction of the length of its slot $d$. The plate 23 has also another projection $m$ which is arranged to take into a notch 14ª formed in the block 14 thus when said projection $m$ enters this notch 14ª (as shown by Fig. 8) the said block 14 is locked or held firmly in position thus holding the fork 11 and wheel 5 against longitudinal motion while yet permitting the handle 13 and other parts to move freely.

When the handle lever 13 is adjusted in its central position as is shown by Figs. 1 and 2 it will have brought the block 18 opposite the block 14 and the part 13ª on said lever 13 will have engaged with the slot in said block 14 sufficiently to hold said block and prevent it from moving. This partial engagement of the part 13ª with the block 14 permits the lever 13 to remain in the gateway $c$ in the cover 22 (see Fig. 2) so that the sides of the gateway $c$ prevent said lever from being moved upon its pivot by which means all the parts which are operated by said handle 13 are securely held or locked in position. When the handle 13 is in the position stated it will have adjusted the bar 12, the fork 11 and the wheel 5 in the positions shown by Fig. 1 as well as having adjusted the bar 17, fork 15 and wheels 6, 6ª and 7 in their respective positions also shown by the same figure. By this adjustment, the wheel 5 is held out of gear with any of the other wheels, thus should the engine be started into motion the wheel 19 would rotate the wheel 20, the shaft 2, the wheels 6 (6ª) the wheel 7, the wheel 21 and the wheel 8, but no motion would be transmitted to the shaft 4, hence this would remain stationary.

By moving the handle from the gateway $c$ into the slot $b$ and from right to left along said slot $b$ until the position shown by Fig. 9 is reached, said handle will have brought the plate 23 forward so that its projection $m$ will have entered the notch 14ª in the block 14 thus securing the parts in connection therewith as hereinbefore described, while it will afterwards have brought the block 18, the bar 17 and the fork 15 (15ª) into the positions where these parts will have caused the wheel 6 to mesh or gear with the wheel 5, so that on the shaft 10 commencing to rotate with the parts so adjusted, the wheels 19, 20, 6 and 5 will transmit motion to the shaft 4, and this may be arranged to be at the slow speed.

When the handle 13 is moved from the position stated, to the opposite end of the slot $b$ as shown by Fig. 3, the locking plate 23 will have remained stationary and so also will the parts it controls, but the block 18 will have been moved forward so that the wheel 7 will have been brought into gear with the wheel 5 while still remaining in gear with the wheel 6ª, hence in this case the rotary motions of the shaft 10 will cause the wheels 19, 20, 6ª and 7 to revolve the wheel 5 in the opposite direction to that last before described, consequently the motion of the parts rotated by the shaft 4 will be reversed in direction.

By removing the handle from the slot $b$ and taking it through the gateway $c$ into the slot $a$, it carries its enlarged part 13ª into full engagement with the block 14 while still remaining sufficiently in engagement with the block 18, so that by containing the motion of said handle 13 until the end to the right of slot $a$ is reached, both of the blocks 14, 18, both bars 12, 17 and both of the forks 11, 15 (15ª) will have been so moved that the wheel 5 is brought to be clear of the wheel 7 as well as clear of the wheel 6 but its clutch 5ᵇ will engage with the clutch 19ª so that the motions of the wheel 19 by its clutch 19ª, the clutch 5ᵇ and the wheel 5 will then transmit motion direct to the shaft 4 and that in the proper direction and at what may be arranged to be the second or intermediate speed.

By adjusting the handle 13 at the opposite end of the slot $a$ to the one last before described, as is shown by Fig. 10, the two blocks 14, 18 the bars 12, 17, their forks 11, 15 (15ª) and the wheels which they operate will have been moved into the positions where the clutch 5ª on the wheel 5 will be in engagement with the clutch 8ª on the wheel 8 while the teeth of said wheel 5 will be entirely clear of all the other wheels. When the parts are adjusted in these positions, the motion of the shaft 10 is transmitted through the wheels, 19, 20, shaft 2, wheels 21 and 8 to the wheel 5 which at all times transmits motion to the shaft 4, hence the third or highest speed may be secured.

Although the several arrangements of the gearing wheels and the various methods of adjusting same to attain the desired respective speeds or movements give (so far as I think) the best results, yet I am aware that by altering the positions of the wheels and varying their dimensions, the positions assumed by the several parts as hereinbefore described to secure the slowest speed may be used to secure the second speed or even the highest speed, as well as may other alterations secure other speeds, and that without departing from the nature of my invention.

Such being the nature and object of my said invention, what I claim is:—

1. Change speed gearing, comprising splined shafts, wheels mounted to slide thereon and to transmit motion thereto, operating forks engaging with said wheels, a hand lever, two sliding bars carrying said operating forks, grooved blocks fixed upon said bars, the groove in one block being formed to receive and be always in engagement with the hand lever while the groove in the other block is arranged so that the operating lever may be disengaged therefrom, for the purpose described.

2. Change speed gearing, comprising splined shafts, wheels mounted on said shafts to transmit rotary motion thereto, forks for operating said wheels, two bars carrying said forks, slotted blocks fixed upon said bars, a hand lever engaging said slotted blocks, a locking plate arranged to slide in a lateral direction upon its supports said plate having a groove through which the hand lever extends and a cover supporting said locking plate, said cover having two parallel slots and a gateway between them for guiding movement of the hand lever.

JAMES RHODES.